(12) United States Patent
Asano et al.

(10) Patent No.: US 7,083,688 B2
(45) Date of Patent: Aug. 1, 2006

(54) HIGH-STRENGTH RACE AND METHOD OF PRODUCING THE SAME

(75) Inventors: Shinji Asano, Kanagawa-ken (JP); Youichi Watanabe, Kanagawa-ken (JP); Tatsuo Iguchi, Kanagawa-ken (JP); Kanji Ueno, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/996,597

(22) Filed: Nov. 30, 2001

(65) Prior Publication Data

US 2002/0112787 A1 Aug. 22, 2002

(30) Foreign Application Priority Data

Dec. 14, 2000 (JP) ............................. 2000-380666

(51) Int. Cl.
*C21D 6/00* (2006.01)
*C21D 8/00* (2006.01)

(52) U.S. Cl. ....................... 148/663; 148/649; 420/108

(58) Field of Classification Search ................ 420/106, 420/108, 109; 148/335, 649, 663, 906, 572; 384/625, 912
See application file for complete search history.

(56) References Cited

U.S. PATENT DOCUMENTS 4,115,111 A * 9/1978 Itoh et al. .................... 420/108
5,922,149 A 7/1999 Mallen Herrero et al.
6,475,305 B1 * 11/2002 Watari et al. ................ 148/320

FOREIGN PATENT DOCUMENTS

| EP | 0 332 284 | 9/1989 |
|---|---|---|
| GB | 766115 | 1/1957 |
| JP | 63-65020 | 3/1988 |
| JP | 06-173967 | 6/1994 |
| JP | 7-90380 | 4/1995 |
| JP | 9-291337 | 11/1997 |
| JP | 10-8202 | 1/1998 |
| JP | 10-140284 | 5/1998 |
| JP | 11-279696 | 10/1999 |
| JP | 2002-12941 | * 1/2002 |

OTHER PUBLICATIONS

Machine-English translation of Japanese patent 9-29137 dated Nov. 11, 1997.*

* cited by examiner

*Primary Examiner*—Scott Kastler
(74) *Attorney, Agent, or Firm*—Foley & Lardner LLP

(57) ABSTRACT

The high-strength race of the present invention comprises using A steel for a high-strength race comprising the following elements in percentage by weight: C: 0.30 to 0.60%, Si: 0.30 to 1.30%, Mn: 0.5 to 1.5%, B: 0.0050% or less, Cr: 0.1 to 0.5%, Mo: 0.1 to 0.5%, Si+Mo: 0.5 to 1.4%, Ni: 0.02 to 1.0%, the balance of Fe and unavoidable impurities, performing induction hardening to make the race have a surface hardness of 58 HRC or more and further a surface hardness of 52 HRC or more even after the surface is tempered at 300° C. The high-strength race is superior in rotating fatigue properties, anti-surface fatigue strength and productivity by a combination of composition control and induction hardening.

10 Claims, 3 Drawing Sheets

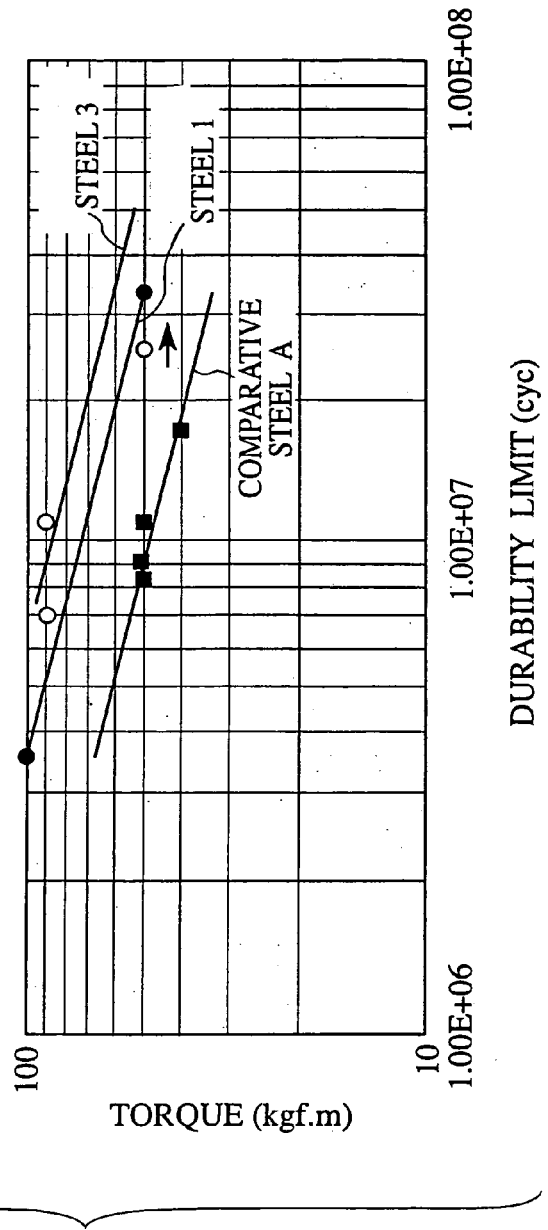

HIGH-STRENGTH RACE AND METHOD OF PRODUCING THE SAME

BACKGROUND OF THE INVENTION

1. Field of the Invention

The present invention relates to a high-strength race which has superior rolling fatigue properties, high anti-surface fatigue strength and is superior in productivity and to a method of producing the race.

2. Description of the Related Art

There has been an increasing need for vehicles to attain low fuel consumption and low pollution from the standpoint of environmental safeguard in recent years. As one of measures to decrease fuel consumption and exhaust gas, it is effective to make a car body light-weight. Therefore, attempts are being made to develop various small-sized and light-weight structural parts of car bodies.

When vehicles to which a small-sized and light-weight drive shaft is applied are used, some cases are known where flaking and pitching of an outer race occur at the relatively early stage and therefore the life of the outer race comes to an end. It has been required for the outer race to possess high impact properties to ensure safety. Further, there is an increasing need to extend the life span of the outer race to cope with the development of outer races reduced in size. For technologies used to extend the life span of the outer race, complex heat treatment in which induction hardening is carried out after nitration is proposed in the publication of Japanese Patent Application Laid-open No. 6-173967.

SUMMARY OF THE INVENTION

It is found from the studies made in detail by the inventors of the present invention that the reason why the life span of an outer race is shortened is as follows.

When a drive shaft is small-sized, a contact area between the outer race and a ball in, particularly, a Zeppa type, is decreased and therefore surface pressure is increased, which is associated with a significant heat evolution. Because the temperature of the surface layer of the rolling part becomes high, the surface layer is softened due to a tempering phenomenon and therefore the rolling fatigue properties are remarkably deteriorated. As a result, flaking and pitching arise at the early stage.

Enhancement of the high temperature hardness of the surface layer of the rolling part of the outer race is effective to improve the rolling fatigue properties. Examples of methods used to attain the object include two methods in which the initial hardness is enhanced and the resistance to high temperature softening is made higher.

Induction hardening is given for example of a method to enhance the initial hardness of the surface layer. This is a technology used to harden only the surface layer efficiently by the induction current induced by a high-frequency electromagnetic field. However, there is a limit to the improvement in the initial hardness which improvement is made by the above measures. Carburization hardening is sometimes adopted to obtain a higher initial hardness. This method, however, has the drawback of reduced impact strength.

Examples of methods to improve resistance to high-temperature softening include the technologies are disclosed in the publication of the above-described JP-A No. 6-173967. This method, however, requires a step of carrying out nitriding and induction hardening.

All of the carburization hardening method and the technologies disclosed in the publication of JP-A No. 6-173967 require a process for carburization, nitriding and the like, causing the aggravation of the conditions concerning production lead time and production cost. The present invention was made in view of the above-described problems in prior art. It is an object of the present invention to provide a high-strength race which has not only high impact resistance but also superior rolling fatigue properties and is superior in productivity and also a method of producing the race.

The present invention attains high anti-impact strength and rolling fatigue properties by a combination of a hard surface obtained by induction hardening and an improvement in resistance to high-temperature softening by the selection of an optimum alloy composition, without imparing forgeability and machining processability by a combination of forging conditions, heat treatment conditions. Since the high-strength race can be produced by highly productive induction hardening while maintaining high forgeability and machining processability, the present invention is also provided with high productivity.

A high-strength race according to the present invention comprises using a steel containing 0.30 to 0.60% of C., 0.30 to 1.30% of Si, 0.5 to 1.5% of Mn, 0.0050% or less of B, 0.1 to 0.5% of Cr, 0.1 to 0.5% of Mo, 0.5 to 1.4% of Si and Mo and 0.02 to 1.0% of Ni, which is balanced by Fe and unavoidable impurities and treating the steel by induction hardening such that the surface hardness is 58 HRC or more and the surface hardness after tempered at 300° C. is 52 HRC or more.

BRIEF DESCRIPTION OF THE DRAWINGS

FIG. 3 is a graph showing the results of row angle rotating endurance tests for an outer race according to the embodiment of the present invention and for comparative example.

DETAILED DESCRIPTION OF THE PREFERRED EMBODIMENT

Figure 1:
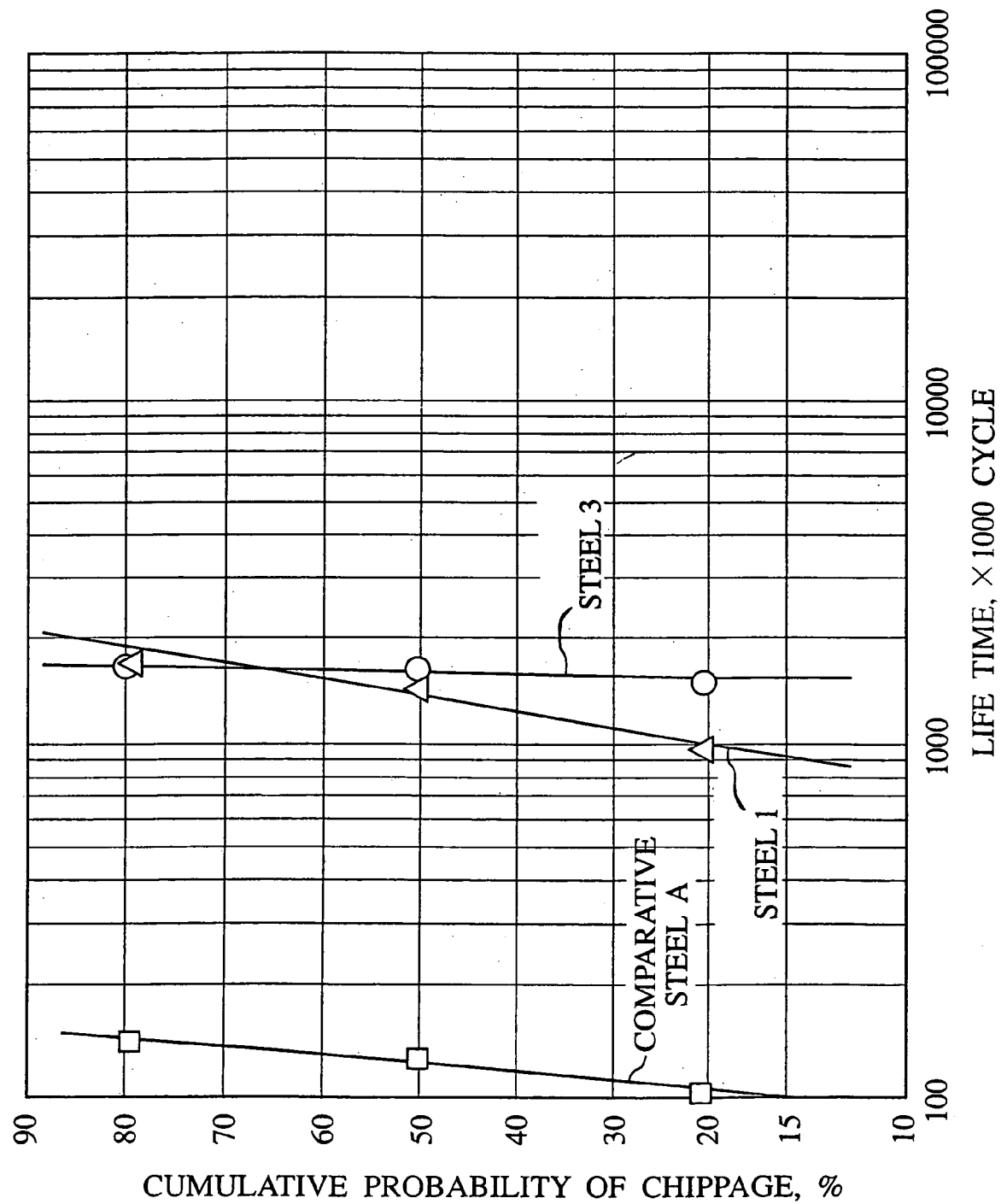
FIG. 1 is a graph showing the results of roller pitching tests for the embodiment of the present invention and for comparative example.

As described above, the high-strength race of the present invention uses a steel containing C (Carbon), Si (Silicon), Mn (Manganese), B (Boron), Cr (Chromium), Mo (Molybdenum), Ni (Nickel) and S (Sulfur) in each predetermined amount wherein the total content of Si and Mo is controlled in a predetermined range, which is balance by Fe and unavoidable impurities. Hereinafter, the range of the content of each component and the reason why the content of each component is limited will be explained.

C: 0.30 to 0.60%

C is an essential element used to ensure the strength of a mechanical part. When C is added in an amount less than 0.30%, it is difficult to make the mechanical part have a surface hardness of 58 HRC or more even by induction hardening. On the other hand, when the amount exceeds 0.60%, quench cracks tend to be caused by induction hardening.

Si: 0.30 to 1.30%

Si is an element used to raise resistance to temper softening. Therefore, Si is added in an amount of 0.30% or more. On the other hand, the addition of Si in an excess amount decreases deformability and causes cracks to easily occur during forging. Therefore the upper limit is 1.30%.

Mn: 0.50 to 1.50%

Mn is an element which enhances hardenability and contributes to the increase of surface hardness. If the amount of Mn is less than 0.50%, only an insufficient effect is obtained whereas if Mn is added in an amount exceeding 1.50%, cracks are easily caused during forging.

B: 0.005% or less

B present as a solid solution in Fe enhances induction hardenability and improves anti-impact bending and anti-impact torsion properties. B is preferably contained in an amount of at least 0.0005%. However, even if Mn is contained in an amount exceeding 0.005%, its effect saturates and it rather produces such a harmful effect that cracks tend to occur in hot working such as rolling and forging.

Cr: 0.1 to 0.5%

Cr is an element enhancing the hardenability of steel like the case of Mn. In the case where the diameter or thickness of a part to be subjected to induction hardening, the part is cooled sufficiently rapidly during hardening and it is therefore unnecessary to add Cr. In the case of relatively large parts, insufficient cooling sometimes causes a poor hardening effect and it is therefore desirable to add Cr to improve hardenability. The effect of Cr is unsatisfactory when the amount of Cr is less than 0.1% whereas an amount exceeding 0.5% impairs machinability and hot workability.

Mo: 0.1 to 0.5%

Mo enhances the toughness of steel, improves impact properties and improves anti-impact bending and anti-impact torsion properties. Therefore, Mo is added in an amount of 0.1% or more. If Mo is added in an amount exceeding 0.5%, the machinability and hot workability are impaired.

Ni: 0.02 to 1.0%

Ni enhances the toughness of steel. When the amount of Ni is less than 0.02%, an only insufficient effect is obtained whereas when Ni is contained in an amount exceeding 1.0%, the machinability and warm forgeability are impaired.

Si+Mo: 0.5 to 1.4%

Si and Mo have the effect of improving resistance to high-temperature temper softening. Therefore, Si and Mo are added in a total amount of 0.5% or more. On the other hand, an amount exceeding 1.4% impairs the machinability and forgeability as described above.

It is to be noted that the steel to be used in the present invention contains the above-described elements as its essential components and besides these compounds, a combination of one or more elements selected from 0.05% or less of Bi (Bismuth), 0.10% or less of S (Sulfur), 0.01% or less of Ca (Calcium), 0.10% or less of Zr (Zirconium), 0.10% or less of Sb (Antimony) and 0.01% or less of Pb (Lead) may be added.

The use of such additive elements can enhance surface fatigue properties and ensure the same machinability as that of conventional steel. Therefore, it is desirable to add these elements according to the need.

The procedures for producing the race of the present invention from the above steel are as follows.

The above steel is heated to 720 to 790° C. to carry out warm forging. Next, the steel is kept at 850±10° C. to carry out normalizing, followed by cooling at a rate of 3 to 10° C./min, then kept at 550° C. for 20 minutes or more and allowed to cool in the air. The resulting steel is fabricated into a predetermined form by machining. Further, the steel is treated by induction hardening and tempering and made into a final form by machining to obtain such a high-strength race as described above.

As to the temperature at which the warm forging is carried out, higher temperature ensures high deformability, which renders it easy to fabricate. However, it offers opportunity for the occurrence of buckling on account of a lack of resistance to deformation. Moreover, if the heating temperature is too high, there is a fear that the life of a mold is significantly shortened. Taking these results into consideration, the heating temperature preferably used in the warm forging is designed to be 720 to 790° C. in the present invention.

In the present invention, the normalizing is performed in the above conditions to thereby attain a hardness of 91 to 96 HRB. If the hardness is deviated from this range, the abrasion loss of tools is increased and tools are worn by chips, which shortens the life of the tools, resulting in reduced productivity of the race.

The high-strength race produced by using the above-described steel according to the present invention has a surface hardness of 58 HRC or more after induction hardening is carried out and a surface hardness of 52 HRC or more after tempered at 300° C.

As described above, the race of the present invention is improved significantly in wear resistance and fatigue properties by using a steel having high resistance to softening and by controlling the surface hardness after hardened and tempered to 52 HRC or more. Moreover, the steel according to the present invention exhibits good warm forgeability by selecting a proper heating temperature. Thereafter, appropriate normalizing is performed to attain a hardness of 91 to 96 HRB suitable to cutting work. The above process is combined with highly productive induction hardening whereby the above race having excellent wear resistance and fatigue properties can be produced and the productivity is therefore high.

EXAMPLE 1

The following experiments were made to prove the effect of the present invention.

A steel ingot having the composition shown in Table 1 was produced and made into a billet, which was then hot-rolled into a round bar having a diameter of 50 mm. A cylindrical specimen having a diameter of 30 mm and a height of 45 mm was produced from the resulting round bar by machining. The obtained cylindrical specimen was heated to 720° C. and 780° C. to carry out warm forging with a work ratio of 50% by using a press machine thereby evaluating the warm forgeability. After that, the relationship between the condition (cooling rate) of normalizing and hardness was examined. The results are shown in Table 2.

On the other hand, a roller pitching test was made to evaluate the surface fatigue strength. Therefore, the following operations were carried out for a test part having a diameter of 26 mm and a length of 28 mm.

First, the surface temperature of the test part was raised by high-frequency heating in 0.9 seconds until it became 850° C. Further, the temperature of the test part was raised to 1150° C. in 1.9 seconds to carry out water quenching and then subjected to tempering performed at 170° C. for 120 minutes.

The roller pitching life of a comparative steel was a level of $10^5$ whereas it was confirmed that the life span of steel as described herein was extended ten times that of the comparative steel. The conditions of the roller pitching test are described below and the results of the test are shown in Table 1.

(Conditions of roller pitching test)
(1) Applied load: 18.6 kN
(2) Surface pressure: 4500 MPa
(3) Rotating speed (drive side)
(4) Slip factor: 20%
(5) Drive roller: small roller (sample product)
(6) Slave roller: large roller (SUJ2)
(7) Temperature of lubricating oil: 100 to 110° C.
(8) Pitching detecting method: vibration sensor

TABLE 1

| | | Chemical ingredients (mass %) | | | | | | | | | | | |
|---|---|---|---|---|---|---|---|---|---|---|---|---|---|
| No. | Application | C | Si | Mn | P | S | Cu | Ni | Cr | Mo | Sol. B | Bi | Pb |
| 1 | Described | 0.55 | 0.49 | 0.55 | 0.008 | 0.017 | 0.02 | 0.02 | 0.17 | 0.18 | 0.014 | 0.030 | — |
| 2 | Steel | 0.54 | 0.52 | 0.63 | 0.018 | 0.022 | 0.02 | 0.03 | 0.17 | 0.18 | 0.002 | 0.020 | — |
| 3 | | 0.54 | 1.00 | 0.60 | 0.011 | 0.012 | 0.01 | 0.03 | 0.36 | 0.33 | — | 0.038 | — |
| 4 | | 0.48 | 0.50 | 0.59 | 0.016 | 0.020 | 0.01 | 0.03 | 0.25 | 0.20 | 0.015 | — | — |
| 5 | | 0.58 | 0.52 | 0.59 | 0.015 | 0.020 | 0.01 | 0.03 | 0.25 | 0.20 | 0.014 | — | — |
| A | Comparative | 0.55 | 0.22 | 0.64 | 0.019 | 0.012 | 0.06 | 0.03 | 0.30 | 0.01 | — | — | 0.07 |
| B | Steel | 0.53 | 0.25 | 0.66 | 0.017 | 0.013 | 0.06 | 0.01 | 0.30 | 0.01 | — | — | 0.08 |
| C | | 0.55 | 0.52 | 0.64 | 0.015 | 0.015 | 0.09 | 0.03 | 0.29 | 0.01 | 0.014 | — | — |
| D | | 0.55 | 0.20 | 0.65 | 0.015 | 0.015 | 0.10 | 0.03 | 0.30 | 0.20 | 0.014 | — | — |

TABLE 2

| | | Deformation resistance in process of forging (MPa) Forging temperature (° C.) | | | | | Hardness of normalized steel after forging (HRB) Rate of cooling from 850° C. (° C./min) | | | | |
|---|---|---|---|---|---|---|---|---|---|---|---|
| No. | Application | 700 | 720 | 750 | 790 | 820 | 3 | 6 | 10 | 30 | 60 |
| 1 | Described | 320 | 315 | 298 | 272 | 248 | 92 | 93 | 95 | 97 | 103 |
| 2 | Steel | — | — | — | — | — | — | — | — | — | — |
| 3 | | 352 | 350 | 340 | 306 | 274 | 93 | 94 | 96 | 98 | 108 |
| 4 | | 290 | 288 | 277 | 256 | 240 | 91 | 92 | 94 | 96 | 101 |
| 5 | | 324 | 325 | 308 | 282 | 262 | 93 | 93 | 95 | 96 | 104 |
| A | Comparative | 316 | 312 | 273 | 245 | 240 | 91 | 92 | 92 | 92 | 95 |
| B | Steel | — | — | — | — | — | — | — | — | — | — |
| C | | — | — | — | — | — | — | — | — | — | — |
| D | | — | — | — | — | — | — | — | — | — | — |

EXAMPLE 2

Figure 2:
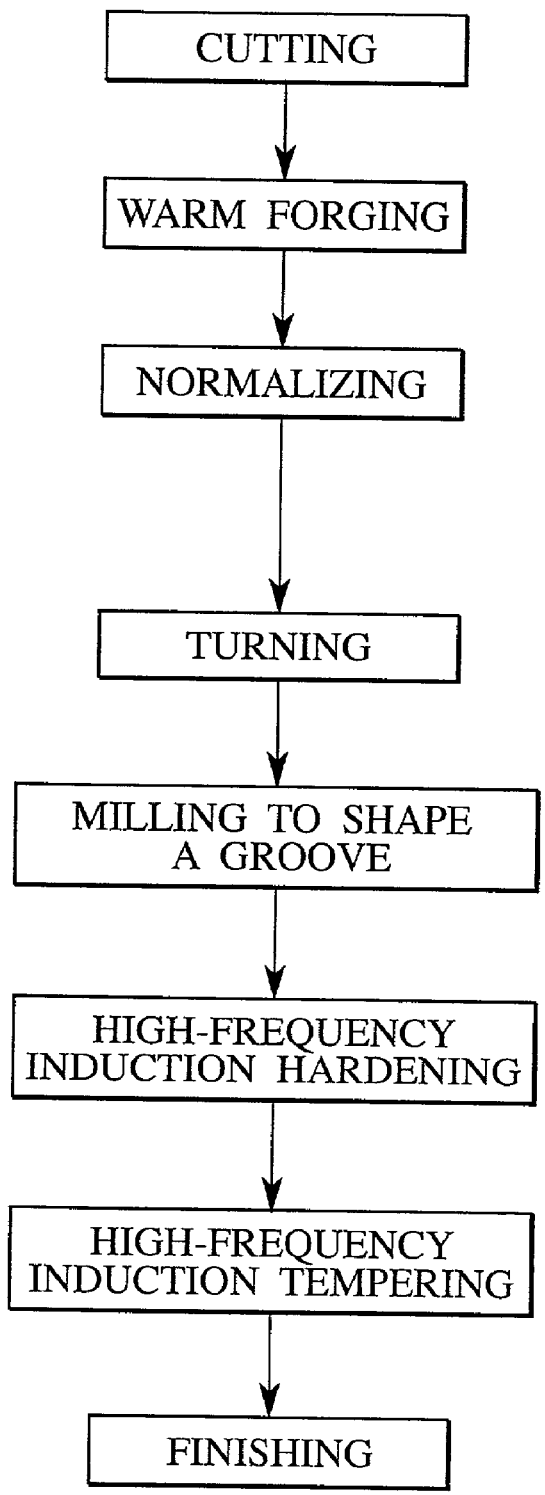
FIG. 2 is a flowchart showing a step of producing an outer race according to the embodiment of the present invention.

An outer race was produced from the steel having the composition shown in Table 1 according to the steps shown in FIG. 2. Although the hardness of steel as described herein at room temperature was higher than that of the comparative steel, the resistance to deformation during warm forging was not excessively high. The steel was treated by warm forging without any problem.

The results of the measurement of the hardness before machining and after normalizing are shown in Table 3. The normalizing condition 1 in Table 3 is as follows: the steel sample kept at 850° C. for 40 minutes, thereafter cooled to 550° C. at a cooling rate of 10° C./min over 30 minutes and further allowed to cool in the air. The normalizing condition 2 is as follows: the steel sample is kept at 850° C. for 40 minutes, thereafter cooled to 550° C. at a cooling rate of 3.3° C./min over 90 minutes, then kept at 550° C. for 30 minutes and then allowed to cool in the air.

Since the cooling rate of the normalizing condition of steel as described herein is designed to be 3 to 10° C/min, the same hardness as that of comparative steel A which is conventional steel is obtained. The results of the measurement of the abrasion loss of tools during machining are shown in Table 4. A desired hardness can be obtained to provide sufficient machinability by optimizing the cooling rate in the normalizing step. Moreover, Table 5 shows the results obtained by measuring the hardness of the hardened layer or surface layer of the part treated by induction hardening.

For the evaluation of surface fatigue strength, rotating endurance tests for three types of steel, namely the steels 1 and 2 and the comparative steel A were made in a state that these steels were each incorporated into a drive shaft. The results of the endurance test are shown in FIG. 3.

As shown in FIG. 3, it was confirmed that steel as described herein had high durable strength in actual working like the roller pitching test.

From the above, the outer race was produced to confirm the productivity and, as a result, it was confirmed that the outer race of the present invention had excellent forgeability, machinability and grinding processability. Moreover, the outer race is properly balanced between strength properties and productivity. The action and effect of the above examples according to the present invention may be said to be significantly effective in industrial fields.

TABLE 3

| No. | Application | Condition of normalizing | Hardness of normalized steel after forging (HRB) |
|---|---|---|---|
| 1 | Described | Condition 1 | 94 |
| 2 | Steel | Condition 1 | 94 |
| 3 | | Condition 2 | 95 |
| 4 | | — | — |
| 5 | | — | — |
| A | Comparative | Condition 1 | 93 |
| B | Steel | — | — |
| C | | — | — |
| D | | — | — |

Condition 1: The steel sample is kept at 850° C. for 40 minutes, thereafter cooled to 550° C. at a cooling rate of 10° C./min over 30 minutes and further allowed to cool in the air.
Condition 2: The steel sample is kept at 850° C. for 40 minutes, thereafter cooled to 550° C. at a cooling rate of 3.3° C./min over 90 minutes, then kept at 550° C. for 30 minutes and then allowed to cool in the air.

TABLE 4

| No. | Application | Turning operation | | | 
|---|---|---|---|---|
| | | VB wear rate at outer periphery | VB wear rate at inner periphery | Easiness of chip breaking |
| 1 | Described Steel | 0.27 | 0.20 | Excellent |
| 2 | | 0.28 | 0.22 | Good |
| 3 | | 0.33 | 0.18 | Excellent |
| 4 | | — | — | — |
| 5 | | — | — | — |
| A | Comparative Steel | 0.30 | 0.15 | Excellent |
| B | | — | — | — |
| C | | — | — | — |
| D | | — | — | — |

TABLE 5

| No. | Application | Hardness of outer-race hardened by high-frequency induction hardening | | | | Hardness at groove after 300° C. tempering |
|---|---|---|---|---|---|---|
| | | At groove | | At axis | | |
| | | Surface hardness | ECD | Surface hardness | ECD | |
| 1 | Described Steel | 62–64 | 2.8 | 64–66 | 5.0 | 53–55 |
| 2 | | 61–62 | 2.0 | 62–64 | 5.2 | 52–54 |
| 3 | | 62–63 | 2.4 | 62–63 | 5.4 | 55–56 |
| 4 | | — | — | — | — | — |
| 5 | | — | — | — | — | — |
| A | Comparative Steel | 60–62 | 2.0 | 61–63 | 5.2 | 49–51 |
| B | | 60–62 | 2.1 | 61–63 | 5.2 | 49–50 |
| C | | 62–63 | 2.1 | 61–63 | 5.2 | 50–52 |
| D | | 62–63 | 2.1 | 61–63 | 5.2 | 50–52 |

Unit of hardness: HRC
ECD: Effective case-hardened depth (mm)

The contents of Japanese Patent Application No. 2000-380666 (filed Dec. 14, 2000) are incorporated herein by reference.

As described above, while the invention has been described in its preferred examples, the present invention is not limited thereto but otherwise variously embodied within the scope of the present invention.

For example, in the above examples, although the case of the outer race is taken as the race, the present invention may be applied to an inner race.

What is claimed is:

1. A method for producing a steel for a high-strength race, including:
   producing a steel comprising the following elements, in percentage by weight:
   C: 0.3 to 0.6%;
   Si: 0.3 to 1.3%;
   Mn: 0.5 to 1.5%;
   B: 0.005% or less;
   Cr: 0.1 to 0.5%;
   Mo: 0.1 to 0.5%;
   Ni: 0.02 to 1.0%;
   balance being Fe and unavoidable impurities,
   wherein the total amount of Si and Mo is in a range from 0.5 to 1.4%; and
   treating the steel by warm-forging under a heating condition between 720° C. and 790° C. and normalizing to obtain a surface hardness of the steel in the range from 91 to 96 HRB.

2. The method according to claim 1, wherein normalizing is performed by keeping the steel at 850±10° C.

3. A steel for a high-strength race comprising:
   a Fe based steel, comprising the following elements, in percentage by weight:
   C: 0.3 to 0.6%;
   Si: 0.3 to 1.3%;
   Mn: 0.5 to 1.5%;
   B: 0.005% or less;
   Cr: 0.1 to 0.5%;
   Mo: 0.1 to 0.5%;
   Ni: 0.02 to 1.0%;
   wherein the total amount of Si and Mo is in a range from 0.5 to 1.4% and the steel is treated by warm-forging performed under a heating condition between 720° C. and 790° C., normalizing performed by keeping the steel at 850±10° C., cooling at a rate of 3 to 10° C./min. after normalizing, keeping the steel at 550° C. for 20 minutes or more and cooling to ambient temperature in air so that a surface hardness thereof is in a range from 91 to 96 HRB.

4. The steel according to claim 3, consisting essentially of a uniform ferrite-pearlite.

5. The steel according to claim 3, being hardened to have a surface hardness of 58 HRC or more by induction heating and quenching.

6. The steel according to claim 5, being treated with tempering to have a surface hardness of 52 HRC or more.

7. The steel according to claim 3, further comprising a hardened surface comprising martensite in a ratio of 90% or more.

8. The steel according to claim 6, wherein the tempering is performed by keeping the steel at 300° C.

9. A steel for a high-strength race according to claim 3, the Fe based steel further comprising, one or more elements selected from the group consisting of the following elements in percentage by weight: Bi: 0.05% or less, S: 0.10% or less, Ca: 0.01% or less, Zr: 0.10% or less, Sb: 0.10% or less and Pb: 0.01% or less.

10. A steel for a high-strength race according to claim 3, wherein the steel is capable of being hardened to 58 HRC.

* * * * *